United States Patent Office 3,417,072
Patented Dec. 17, 1968

3,417,072
INTERMEDIATES IN THE SYNTHESIS
OF SECRETIN
Miklos Bodanszky, Princeton, N.J., assignor to E. R.
Squibb & Sons, Inc., New York, N.Y., a corporation
of Delaware
No Drawing. Filed May 18, 1966, Ser. No. 550,956
30 Claims. (Cl. 260—112.5)

ABSTRACT OF THE DISCLOSURE

This invention relates to novel peptides, and more particularly, to peptide intermediates and their salts utilized in the preparation of the gastrointestinal hormone, secretin. Porcine secretin has the formula:

His-Ser-Asp-Gly-Thr-Phe-Thr-Ser-Glu-Leu-Ser-Arg-
Leu-Arg-Asp-Ser-Ala-Arg-Leu-Glu(NH$_2$)-Arg-Leu-
Leu-Glu(NH$_2$)-Gly-Leu-Val-NH$_2$

In accordance with the process of this invention, secretin is prepared synthetically beginning with L-valinamide and adding the remaining amino acids, one at a time, to the peptides formed. The intermediates thus formed comprise the novel peptides of this invention.

---

This invention relates to novel peptides, and more particularly, to peptide intermediates and their salts utilized in the preparation of the gastrointestinal hormone, secretin. Porcine secretin has the formula:

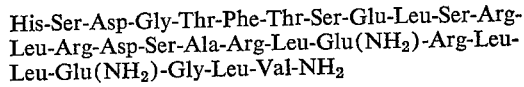
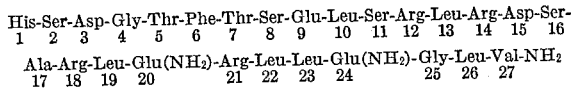

and hence it is a peptide containing 27 amino acid residues containing the amino acids: L-histidine (His); L-aspartic acid (Asp); L-serine (Ser); glycine (Gly); L-threonine (Thr); L-phenylalanine (Phe); L-glutamic acid (Glu); L-glutamine [Glu(NH$_2$)]; L-leucine (Leu); L-arginine (Arg); L-alanine (Ala); and L-valinamide (Val-NH$_2$).

The above mentioned peptide salts include, for instance, hydrochlorides, hydrobromides, acetates, fluoroacetates, such as trifluoroacetate, and chloroacetates such as dichloroacetate.

In accordance with the process of this invention, secretin is prepared synthetically beginning with L-valinamide and adding the remaining amino acids, one at a time, to the peptides formed. Such addition is accomplished by activating the carboxylic acid group in the amino acid to be added, as by protecting the amino group in such amino acid, as by converting it to its benzyloxycarbonyl derivative and converting it to its nitrophenyl ester derivative, and then interacting the amino acid with L-valinamide or a previously prepared peptide in the chain, after removing the protecting group originally present in the peptide.

Among the suitable activating groups may be mentioned any group which causes the acid function to become more reactive, such as mixed anhydrides (which normally involves the acylation of an amine with the mixed anhydrides of, for instance, an acyl amino acid and isovaleric acid), azides, acid chlorides, reaction products with carbodiimides, reactive N-acyl compounds, O-acyl hydroxylamine derivatives, and active esters, such as alkyl esters with electron attracting (negative) subtitutents, vinyl esters, enol esters, phenyl esters, thiophenyl esters, nitrophenyl esters, 2,4-dinitrophenyl esters, and nitrophenylthiol esters. The use of nitrophenyl esters is particularly preferred from the standpoint of yield, lack of by-products, and consequent ease of purification.

In forming peptide sequences of this invention, the amino functions may be protected by commonly used amino protecting groups such as benzyloxycarbonyl, tertiary butyloxycarbonyl, phthalyl, o-nitrophenylsulfenyl, tosyl, and so forth. Methyl and ethyl tertiary butyl, benzyl and so forth may be used to protect the carboxyl groups. The hydroxyl protecting groups may be benzyl, tert. butyl, tetrahydropyranyl and so forth, and the guanidine protecting groups may be nitro, tosyl, p-nitrobenzyloxycarbonyl, protonation, and so forth.

The protecting groups are removed by known reactions such as reduction with sodium in liquid ammonia, hydrogenolysis (for instance, in the presence of a palladium on charcoal catalyst), treatment with a hydrohalo acid (such as hydrobromic or hydrochloric acids) in acetic acid or treatment with trifluoroacetic acid.

To prepare the free amines after treatment with a hydrohalo acid in acetic acid, the hydrobromide salt is treated either with an ion exchange resin such as Amberlite IR400 or so neutralized with an amine such as triethylamine.

The products of this invention are prepared by the addition of the appropriate amino acids, one by one, to the C-terminal portion, as more fully detailed in the following examples of the secretin molecule. All temperatures are in degrees centigrade unless otherwise stated.

In like manner, the remainder of the secretin molecule is built up in stepwise fashion, adding the appropriate amino acids to the previously formed peptide chains until the complete molecule is formed.

EXAMPLE 1

Benzyloxycarbonyl-L-valinamide (I)

Benzyloxycarbonyl-L-valine p-nitrophenyl ester (M.P. 67–68°, 18.6 g.) is suspended in methanol (50 ml.) to dissolve part of the material. A methanolic solution of ammonia (40 ml., ca. 3 N) is added. A clear yellow solution results and crystallization of the product starts after a few minutes. After one hour at room temperature, the crystals are filtered and washed with methanol (ca. 50 ml.) and with ethyl acetate (ca. 50 ml.). The air dried product (8.25 g.) melts at 206–208°. From the mother liquor, more material (0.95 g.) is secured, M.P. 206–207°. Total yield, 9.2 g. (73.5%). A sample (3.5 g.) is recrystallized from ethyl acetate (450 ml.). The purified amide (3.0 g.) melts at 206–208°, [α]$_D^{22}$ +22° (c. 2, dimethylformamide). The melting point is unchanged after sublimation at 190° and 0.05 mm. Hg.

Analysis.—Calcd. for I, C$_{13}$H$_{18}$N$_2$O$_3$: C, 62.4; H, 7.2; N, 11.2. Found: C, 62.4; H, 7.3; N, 11.2.

EXAMPLE 2

Benzyloxycarbonyl-L-leucyl-L-valinamide (II)

Benzyloxycarbonyl-L-valinamide (I) (12.5 g.) is suspended in acetic acid (50 ml.) and treated with hydrobromic acid in acetic acid (ca. 4 N, 50 ml.). Soon a clear solution is obtained and evolution of gas (CO$_2$) can be observed and later also the deposition of crystals. After one and a half hours at room temperature, ether (250 ml.) is added and the crystalline hydrobromide is filtered off, washed with ether (125 ml.) and dried over sodium hydroxide in vacuo. The yield is quantitative (9.8 g.), M.P. 248–253°. The amide hydrobromide is dissolved in dimethylformamide (100 ml.), triethylamine (10 ml.) is added to the solution followed by benzyloxycarbonyl-L-leucine p-nitrophenyl ester (23.2 g.). Some heat evolution will be observed. The mixture is cooled to room temperature; after a few minutes, it shows no ninhydrin reaction and soon it turns into a semisolid mass of crystals. After three hours at room temperature, the mixture is diluted with ethyl acetate (300 ml.), filtered and the crystals washed with ethyl acetate (200 ml.), chlorofrom (300 ml.) and again with ethyl acetate (200 ml.). The air dried product (15.8 g.) sinters at 225° and melts at 232–234°. From the mother liquors a small second crop (0.25 g.) is obtained, M.P. 232–233°. Total yield, 88%. Recrystallization of a sample from hot 95% ethanol raises the M.P. to 234–236°, $[\alpha]_D^{22}$ —1° (c. 2.5, dimethylformamide). The protected dipeptide amide sublimes unchanged at 220° and 0.05 mm. Hg.

*Analysis.*—Calcd. for II, $C_{19}H_{29}N_3O_4$: C, 62.8; H, 8.0; N, 11.6. Found: C, 62.9; H, 8.1; N, 11.6.

EXAMPLE 3

Benzyloxycarbonyl-glycyl-L-leucyl-L-valinamide (III)

To a suspension of the protected dipeptide amide (II), (14.6 g.) in acetic acid (40 ml.) hydrobromic acid in acetic acid (ca. 4 N, 40 ml.) is added. After one and a half hours at room temperature, the mixture is diluted with ether (400 ml.). A semisolid mass forms and is treated with fresh ether until it disintegrates. The hydrobromide is filtered off, washed with ether and dried in vacuo over sodium hydroxide for one hour. It is dissolved in dimethylformamide (100 ml.), triethylamine (14 ml.) and benzyloxycarbonylglycine p-nitrophenyl ester (16.5 g.) are added to the solution. Some evolution of heat is observed and the mixture is cooled to room temperature where it is kept for about three hours. The precipitate (triethylammonium bromide) is filtered off and washed with dimethylformamide (50 ml.) Ethyl acetate (500 ml.) and N HCl (400 ml.) are added to the filtrate and the organic layer is washed with N HCl (400 ml.) and with water (twice 400 ml.). The aqueous washes are extracted in the same order with a portion (ca. 300 ml.) of ehtyl acetate. From the combined ethyl acetate solutions, a precipitate slowly forms. Most of the solvent is removed by evaportaion and the protected tripeptide amide is washed with ethyl acetate. The dry product weighs 16.8 g. (quantitative yield) M.P. 170–175° with some sintering at 160°. This crude product is extracted with boiling ethyl acetate (ca. 200 ml.) to give 14.5 g. (86%) of a product with a melting point of 186–187°. A sample (0.60 g.) is recrystallized from hot water (300 ml.); the crystals are washed with water (100 ml.) and dried. The recovered material (0.50 g.) melts at 187–190°, $[\alpha]_D$ —14° (c. 2, dimethylformamide).

*Analysis.*—Calcd. for III, $C_{21}H_{32}N_4O_5$: C, 60.0; H, 7.7; N, 13.3. Found: C, 60.2; H, 7.7; N, 13.1.

EXAMPLE 4

Benzyloxycarbonyl-L-glutaminylglycyl-L-leucy-L-valinamide (IV)

The benzyloxycarbonyl group is removed from the protected tripeptide amide (III) (12.7 g.) as described in the previous paragraph. To the solution of the hydrobromide in dimethylformamide (90 ml.), triethylamine (11.2 ml.) and benzyloxycarbonyl-L-glutamine p-nitrophenyl ester (13.25 g.) are added. The mixture, which is cooled with water to keep it at room temperature, soon turns into a semisolid mass of crystals. After standing overnight at room temperature, the mass is disintegrated with the aid of chloroform (600 ml.). The product is filtered and washed on the filter with chloroform (200 ml.), with warm ethyl acetate (200 ml.), warm ethanol (200 ml.) and again with warm ethyl acetate (300 ml.). The protected tetrapeptide amide is dried at 50° in vacuo; weight is 16.0 g. (95% yield), M.P. 239–241° dec., $[\alpha]_D^{22}$ —13° (c. 2, dimethylformamide).

*Analysis.*—Calcd. for IV, $C_{26}H_{40}N_6O_7$: C, 56.9; H, 7.3; N, 15.3. Found: C, 56.9; H, 7.3; N, 15.5.

EXAMPLE 5

Benzyloxycarbonyl-L-leucyl-L-glutaminylglycyl-L-leucyl-L-valinamide (V)

The protected tetrapeptide amide (IV) (13.8 g.) is suspended in acetic acid (40 ml.) and treated with hydrobromic acid in acetic acid (ca. 4 N, 40 ml.). After two hours at room temperature, the reaction mixture is diluted with ether (650 ml.), the hydrobromide is filtered and washed with ether (400 ml.). After short drying in vacuo over sodium hydroxide, the hydrobromide is dissolved in dimethylformamide (75 ml.) and triethylamine (2.5 ml.) is added to the solution followed by benzyloxycarbonyl-L-leucine p-nitrophenyl ester (11.6 g.). The precipitate (triethylammonium bromide) is filtered off and washed with dimethylformamide (25 ml.). After three hours, the mixture is diluted with 95% ethanol (600 ml.), the product is filtered off and washed on the filter with 95% ethanol (200 ml.) and ethyl acetate (50 ml.). The protected pentapeptide amide is dried at 50° in vacuo; weight is 13.5 g. (81.5%), M.P. 262–268° dec. (with sintering at 259°). A small second crop (0.70 g.) separates from the pooled mother liquor and washings, M.P. 256–259° dec. This is recrystallized from acetic acid 95% ethanol to give a product (0.50 g.) with M.P. 263–270° dec. Total yield is 14.0 g. (84%).

*Analysis.*—Calcd. for V, $C_{32}H_{51}N_7O_8$: C, 58.1; H, 7.8; N, 14.8. Found: C, 58.1; H, 7.8; N, 14.6.

EXAMPLE 6

L-leucyl-L-glutaminylglycyl-L-leucyl-L-valinamide hydrobromide (Va)

Compound V (3.3 g.) is dissolved in hot acetic acid (20 ml.), the solution is cooled to room temperature and hydrobromic acid in acetic acid (ca. 4 N, 10 ml.) added. After one hour at room temperature, the solution is diluted with ether (250 ml.), the gummy precipitate disintegrated under fresh ether and washed with ether on the filter. The crude hydrobromide is dried in a desiccator over sodium hydrovide overnight. It is dissolved in methanol (50 ml.) and precipitated with ether (150 ml.). The gummy precipitate is dissolved in absolute ethanol (ca. 200 ml.). A crystalline precipitate separates slowly from the solution. Triethylamine (ca. 1 ml.) is added to neutralize the solution. The crystals are washed with ethanol (100 ml.) and dried over $P_2O_5$ in vacuo at room temperature. Weight is 0.50 g., M.P. 215–216° dec. after sintering at 210°. Evaporation of the mother liquor to dryness and treating of the residue with chloroform (50 ml.) gives a second crop, 1.75 g., M.P. which is similar to the first crop. A small third crop (0.35 g.) is obtained from the mother liquors of the second, M.P. 220–222° dec. On paper chromatograms in the system of butanol: acetic acid: water (4:1:5), a single spot ($R_f$=0.60) is shown by all the fractions. Total yield is 2.60 g. (86%). A sample (0.50 g.) is dissolved in hot 95% ethanol (25 ml.). On standing, slow crystallization occurs; a few days later, ethyl acetate (25 ml.) is added and two days later the crystals are filtered off, washed with a 1:1 mixture of ethanol-ethyl acetate (20 ml.) and with ethyl acetate (20 ml.). After drying, the crystals weigh 0.40 g., M.P. 220° dec. (sinters at 200°). A sample is dried at 110° for analysis.

*Analysis.*—Calc'd for VI, $C_{24}H_{46}N_7O_6Br$: C, 47.2; H, 7.7; N, 16.1; Br, 13.2. Found: C, 47,2; H, 7.7; N, 15.9; Br, 13.0.

*Amino acid analysis.*—Glu, 0.9; Gly, 1.1; Val, 1.0; Leu, 2.3; $NH_3$, 0.9.

EXAMPLE 7

L-leucyl-L-glutaminylglycyl-L-leucyl-valinamide (Vb)

The pentapeptide amide hydrobromide (Va) (0.30 g.) is dissolved in methanol (50 ml.) and treated with Amberlite IR400 in OH cycle until the solution gives a negative test with silver nitrate. The resin is removed by filtration, washed with methanol and the solvent removed in vacuo. The residue is treated with chloroform (5 ml.) in which it partially dissolves. Ethyl acetate (50 ml.) is added. The product is filtered and washed with ethyl acetate (25 ml.) and dried on air, weight is 0.20 g., M.P. 260–261° dec. The product gives a single spot, $R_f=0.60$ on paper chromatograms.

*Analysis.*—Calc'd for VII, $C_{24}H_{45}N_7O_6$: C, 54.6; H, 8.6; N, 18.6. Found: C, 55.0; H, 8.6; N, 18.6.

EXAMPLE 8

Benzyloxycarbonyl-L-leucyl-L-leucyl-L-glutaminylglycyl-L-leucyl-L-valinamide (VI)

The pentapeptide amide hydrobromide (Va) (1.22 g.) is suspended in dimethylformamide (10 ml.) in which it partially dissolves. Benzyloxycarbonyl-L-leucine p-nitrophenyl ester (1.55 g.) is added to the mixture which is shaken vigorously for a few minutes, diluted with dimethylformamide (10 ml.), and shaken again. After two hours at room temperature, the mixture is diluted with ethyl acetate (150 ml.), filtered and washed with ethyl acetate (20 ml.). The precipitate is suspended in absolute ethanol (30 ml.), washed on the filter with absolute ethanol (20 ml.) and with ethyl acetate (20 ml.). After drying, the protected hexapeptide amide weighs 1.55 g. (100%); the product sinters at 255°, melts with decomposition at 258–262°.

*Analysis.*—Calc'd for VI, $C_{38}H_{62}N_8O_9$: C, 58.9; H, 8.1; N, 14.5. Found: C, 58.3; H, 7.9; N, 13.9.

EXAMPLE 9

L-leucyl-L-leucyl-L-glutaminylglycyl-L-leucyl-L-valinamide hydrobromide (VIa)

The protected hexapeptide amide (VI) (0.39 g.) is suspended in acetic acid (5 ml.) and treated with hydrobromic acid in acetic acid (4 N, 5 ml.). Soon a clear solution results. After one and a half hours at room temperature, ether (200 ml.) is added; the precipitate is filtered, washed with ether and dried in vacuo over sodium hydroxide. The salt is hygroscopic. Since it gives a single spot ($R_f=0.75$) with ninhydrin on paper chromatograms in butanol-acetic acid-water (4:1:5), it is used without purification.

EXAMPLE 10

L-leucyl-L-leucyl-L-glutaminylglycyl-L-leucyl-L-valinamide (VIb)

The hexapeptide amide hydrobromide (VIa) (from 0.39 g. protected peptide) is converted to the free base as described in Example 7. The product (0.29 g.) separates in crystalline form. On paper chromatograms, it shows a single spot with $R_f=0.75$, M.P. 239–241° dec.

*Analysis.*—Calc'd for X, $C_{30}H_{56}N_7O_8$: C, 56.2; H, 8.8; N, 17.5. Found: C, 56.1; H, 8.9; N, 16.9.

A sample is hydrolyzed with constant boiling hydrochloric acid in an evacuated, sealed ampoule at 110° for 24 hours; it gives 5.1% $NH_3$, calc'd. 5.3%. Quantitative amino acid analysis gives the following molar ratios: Leu, 3.0; Glu, 1.1; Gly, 1.1; Val, 1.1.

EXAMPLE 11

Benzyloxycarbonyl-nitro-L-arginyl-L-leucyl-L-leucyl-L-glutaminylglycyl-L-leucyl-L-valinamide (VII)

A solution of $N^\alpha$-benzyloxycarbonyl-nitro-L-arginine (3.53 g.) and of 2,4-dinitrophenol (2.0 g.) in tetrahydrofuran (60 ml.) is cooled with ice water during the addition of dicyclohexylcarbodiimide (2.1 g.). After about one hour at room temperature, the precipitate (dicyclohexylurea) is filtered off and is washed with tetrahydrofuran (40 ml.). The combined filtrate and washings are evaporated to dryness in vacuo, the residue dissolved in ethyl acetate (ca. 10 ml.) and precipitated with ether (ca. 50 ml.). The ester is washed with ether (ca. 50 ml.) and dried in vacuo.

The hexapeptide amide (VIb) (from 3.9 g. protected hexapeptide amide by the procedure of Example 10 is dissolved in hot (ca. 80°) dimethylformamide (150 ml.) and is mixed with a solution of the above active ester in the same solvent (50 ml.). After about four hours at room temperature, the mixture is diluted with ether (1 liter), the precipitate filtered, washed with ether (0.6 liter), ethyl acetate (0.3 liter) and dried. The product, weight 4.5 g. (92%), M.P. 240–242° (dec.), $[\alpha]_D^{25} -38°$ (c. 2, acetic acid), is shown to be homogeneous by treatment of a small sample with hydrobromic acid in acetic acid, precipitation of the hydrobromide with ether and paper chromatography of this material. A single spot, $R_f=0.83$, is observed in the n-butanol-acetic acid-water (4:1:5) system.

A sample, 0.20 g., is recrystallized from hot 50% ethanol (22 ml.), the crystals are washed with ethanol and ethyl acetate. 0.12 g. is recovered, M.P. ca. 252° dec., $\lambda_{max.}^{EtOH}$ 269 m$\mu$, $E_{1\,cm.}^{1\%}$ 144

*Analysis.*—Calc'd for $C_{44}H_{73}N_{13}O_{12}$: C, 54.2; H, 7.5; N, 18.7. Found: C, 54.3; H, 7.6; N, 18.3.

EXAMPLE 12

Benzyloxycarbonyl - L - glutaminyl-nitro-L-arginyl-L-leucyl-L-leucyl - L-glutaminylglycyl-L-leucyl-L-valinamide (VIII)

The protected heptapeptide (VII) (9.8 g.) is dissolved in warm acetic acid (50 ml.), cooled, and treated with hydrobromic acid in acetic acid (ca. 4 N, 50 ml.). After one hour at room temperature, ether (1.2 liters) is added to the solution; the hydrobromide is filtered, washed with ether and dried in vacuo over sodium hydroxide for a short time. It is dissolved then in dimethylformamide (100 ml.), and is made alkaline with triethylamine (10.4 ml.). Benzyloxycarbonyl-L-glutamine p-nitrophenyl ester (5.0 g.) is added to the mixture which is left to stand at room temperature for about three hours. The mixture is diluted with ethyl acetate (1 liter), the precipitate is filtered and washed with ethyl acetate (0.5 liter), ethanol (0.5 liter) and with ethyl acetate, hot ethyl acetate (0.25 liter) and hot chloroform (0.25 liter). The product is dried first on air and then at 50° in vacuo, weight 10.3 g. (93%), darkens from 250° dec. at 262–264°. A sample (1.0 g.) is dissolved in hot 80% ethanol (10 ml.), cooled, and diluted with 95% ethanol (30 ml.). Slow crystallization took place. After three days the crystals are filtered, washed with ethanol, chloroform and ethyl acetate. The dried material weighs 0.85 g., M.P. 250° dec., $[\alpha]_{20} -32°$ (c. 2, dimethylsulfoxide).

*Analysis.*—Calc'd for $C_{49}H_{81}N_{15}O_{14}$: C, 53.3; H, 7.4; N, 19.0. Found: C, 53.4; H, 7.5; N, 19.2.

EXAMPLE 13

Benzyloxycarbonyl-L-leucyl - L - glutaminyl-nitro-L-arginyl-L-leucyl-L-leucyl-L - glutaminylglycyl-L-leucyl-L-valinamide (IX)

The protected octapeptide (VIII) (11.1 g.) is powdered and added with stirring to acetic acid (50 ml.). Hydrobromic acid in acetic acid (ca. 4 N, 50 ml.) is added to the suspension, and stirring is continued until all the material dissolved and then for 30 minutes more. A total of three hours are required. The amine hydrobromide is precipitated with ether (1.3 liters), filtered, washed with ether and dried in vacuo over sodium hydroxide for a short time. The hydrobromide is dissolved in dimethylformamide (100 ml.), and triethylamine (10.4 ml.) is added to the cooled solution, followed by the benzyloxycarbonyl-L-leucine p-nitrophenyl ester (5.0 g.). After about three hours at room temperature the mixture is diluted with ethyl acetate (2 liters). The precipitate which formed is filtered and washed with 200 ml. portions of ethyl acetate, chloroform, hot chloroform and hot ethyl acetate. The product is dried in vacuo at 50°; weight 11.15 g. (91.5%), M.P. darkens from 255° dec. at about 265°. In a second similar preparation, a quantitative yield is obtained. Treatment of a sample (50 mg.) of (IX) with hydrobromic acid in acetic acid, precipitation of the free nonapeptide amide hydrobromide with ether, and paper chromatographic examination of the product in the system butanol-acetic acid-water, 4:1:5, reveals a single spot ($R_f=0.77$).

A sample of (IX) (0.50 g.) is dissolved in a hot mixture of ethanol (30 ml.) and water (15 ml.). The solution is filtered and allowed to stand at room temperature. After a few days, the crystals are collected, washed with liberal quantities of 95% ethanol, ethyl acetate and hot ethyl acetate. The air dry material (0.25 g.) darkens from 260°, melts with dec. at 267–269°. For analysis, it is dried at 110° in vacuo.

*Analysis.*—Calc'd for $C_{55}H_{92}N_{16}O_{15}$: C, 54.3; H, 7.6; N, 18.4. Found: C, 54.2; H, 7.8; N, 18.2.

EXAMPLE 14

Benzyloxycarbonyl-nitro-L-arginyl-L-leucyl-L-glutaminyl-nitro-L-arginyl-L-leucyl-L - leucyl-L-glutaminylglycil-L-leucyl-L-valinamide (X)

The protected nonapeptide amide (IX) (9.8 g.) is suspended in acetic acid (40 ml.) and hydrobromic acid in acetic acid (ca. 4 N, 40 ml.) is added to the suspension. A homogeneous solution is obtained in about one hour, and the solution is kept at room temperature for an additional hour. Ether (900 ml.) is added to the solution. The precipitated hydrbromide is filtered, washed with ether and dried in vacuo over sodium hydroxide for a short time. It is dissolved in dimethylformamide (80 ml.); the solution is cooled while being made alkaline with triethylamine (5.5 ml). Benzyloxycarbonyl nitro-L-arginine, 2,4-dinitrophenyl ester (10.3 g.) (prepared as described in the preparation of VII) is added followed by more triethylamine (2.2 ml.). After three hours at room temperature when the solution gives no reaction with ninhydrin, it is diluted with ethyl acetate (1 liter). Next day the precipitate is collected on a filter and is washed with ethyl acetate (200 ml.), chloroform (200 ml), hot chloroform (750 ml.), abs. ethanol (200 ml.), and ethyl acetate (200 ml.). The product (8.2 g., 72%) darkens from 250° and melts with dec. at 255–264°. The benzyloxycarbonyl group is removed from a small sample with hydrobromic acid in acetic acid; the resulting free amine gives a single spot on paper chromatograms with $R_f=0.80$ in the system of butanol-acetic acid-water (4:1:5) or with $R_f=0.60$ in the system of butanol-pyridineacetic acid-water (30:20:6:24).

*Analysis.*—Calc'd for $C_{61}H_{103}O_{18}N_{21}$ (M.W. 1418.8): C, 51.7; H, 7.3; N, 20.7. Found: C, 51.9; H, 7.6; N, 20.1.

EXAMPLE 15

Benzyloxycarbonyl-L-alanyl-nitro - L - arginyl-L-leucyl-L-glutaminyl-nitro-L-arginyl - L - leucyl-L-leucyl-L-glutaminylglycyl-L-leucyl-L-valinamide (XI)

The protected decapeptide amide (X) (5.68 g.) is dissolved in acetic acid (30 ml.) and treated with a solution of hydrobromic acid in acetic acid (ca. 4 N, 30 ml.). After one and one-half hours at room temperature, the decapeptide hydrobromide is precipitated with ether (600 ml.), washed with ether and dried briefly in vacuo over sodium hydroxide pellets. The hydrobromide is dissolved in dimethylformamide (40 ml.); triethylamine (4.6 ml.) is added to the solution followed by benzyloxycarbonyl-L-alanine p-nitrophenyl ester (1.72 g.). Finally the mixture is made alkaline with more triethylamine (0.5 ml.). The reaction is allowed to proceed overnight, then the mixture is diluted with chloroform. The addition of 250 ml. of this solvent results in a clear solution, with a second 250 ml. portion a crystalline precipitate forms. This is collected, washed with chloroform (200 ml.) and ethyl acetate (100 ml.). The dry product (4.85 g., 81.5%) melts at 258–264° dec.

*Analysis.*—Calc'd for $C_{64}H_{108}N_{22}O_{19}$: C, 51.6; H, 7.3; N, 20.7. Found: C, 51.0; H, 7.5; N, 19.9.

EXAMPLE 16

L-aspartyl-L-seryl-L-alanyl-L-arginyl - L - leucyl - L - glutaminyl-L-arginyl-L-leucyl - L - leucyl - L - glutaminylglycyl-L-leucyl-L-valinamide (XIIIa)

(a) (1) L - alanyl - L - arginyl - L - leucyl - L - glutaminyl - L arginyl - L - leucyl - L - leucyl - L - glutaminlyglycyl - L - leucyl - L - valinamide (acetate) (XIa).—The protected hendecapeptide (XI) (3.0 g.) is dissolved in 86% acetic acid (100 ml.) and hydrogenated in the presence of a 10% palladium on charcoal catalyst (1.5 g.) for two days. The catalyst is removed by filtration and the solvents by evaporation in vacuo. A sample of this free hendecapeptide acetate (XIa) is examined on paper chromatograms in the system of n-butanol-acetic acid-water (4:1:5), where it gives a single spot ($R_f=0.15$) both with ninhydrin and the Sakaguchi reagent. Similarly, a single spot ($R_f=0.6$) is revealed in the system n-butanol-acetic acid-pyridine-water (30:6:20:24).

(2) Benzyloxycarbonyl - L - seryl - L - alanyl - L - arginyl - L - leucyl - L - gutaminyl - L - arginyl - L - leucyl - L - leucyl - L - glutaminylglycyl - L - lucyl - L - valinamide (acetate) (XII).—To the free hendecapepitide (XIa) in dimethylformamide (40 ml.) benzyloxycarbonyl-L-serine 2,4-dinitrophenyl ester (1.0) g.) is added. The mixture, a gel, is filtered through a glass filter, and undissolved material on the filter is brought into solution with small portions of hot dimethylformamide. A total of 60 ml. of this solvent is used. After three hours, more of the active ester (0.6 g.) is added. After an additional hour, the mixture gives no reaction with ninhydrin. Next day, the mixture is diluted with ethyl acetate (900 ml.), the resulting oily precipitate is triturated with ethyl acetate (1 liter), the solidified protected dodecapeptide (XII) is filtered and washed with ethyl acetate. The product (2.1 g.) is impure as shown by its broad M.P.: sinter at 73°, melts with dec. at 163°. Evaporation of the mother liquor and trituration of the residue with ethyl acetate gives an additional quantity (0.97 g.) of material with a similar melting point.

(3) The crude protected dodecapeptide (XII) (0.65 g.) is dissolved in a mixture of water (40 ml.) and acetic acid (4 ml.) and the solution is extracted with ethyl acetate (three 20 ml. portions).—The ethyl acetate extracts are washed with water (10 ml.). The aqueous wash is pooled with the main aqueous solution; a 10% palladium on charcoal catalyst (0.2 g.) is added and the mixture is hydrogenated for about four hours. After the removal of the catalyst by filtration, the solution is lyophylized. The crude free dodecapeptide weighs 0.46 g. A similar preparation (from 2 moles of protected dodecapeptide) is dissolved in dimethylformamide (10 ml.) and treated with benzyloxycarbonyl-L-aspartic acid β-benzyl, α-p-nitrophenyl ester (1.44 g.). Next day a second portion (0.48 g.) of the active ester is added to the mixture and after three more hours, a last portion (0.48 g.). After three more hours at room temperature, ethyl acetate (400 ml.) is added; the precipitate which formed is filtered and washed with ethyl acetate (200 ml.). The material, which turns into a crystalline mass on the filter, weighs 2.65 g., M.P. 200–220° dec. This crude preparation (1.3 g.) is dissolved in a mixture of acetic acid (40 ml.) and water (40 ml.), a 10% palladium on charcoal catalyst (0.65 g.) is added and the mixture is hydrogenated overnight. After removal of the solvent by filtration and the solvents by evaporation in vacuo, the residue is distributed in a system of n-butanol-0.2% dichloroacetic acid in water, through 60 transfers. Forty ml. lower and upper phases are used. The material in tubes No. 16–26 is practically pure as shown on paper chromatograms, which reveals the presence of a trace of aspartic acid in these fractions. Tubes No. 0–7 contain mostly aspartic acid. In tubes 8–15, the free tridecapeptide contaminated with more aspartic acid is present. A fast moving, ninhydrin-negative, Sakaguchi-positive impurity travels close to the front and is easily separated from the desired material. The contents of tubes No. 16–26 are pooled, the solvents evaporate to a small volume in vacuo, and the free tridecapeptide (XIIIa) is isolated by lyophylization (170 mg.). After hydrolysis with constant boiling hydrochloric acid at 110° for 16 hours in vacuo, a sample shows the following ratios of amino acids: Glu, 2.0; Asp, 1.4; Ser, 0.9; Gly, 1.1; Ala, 1.1; Val, 1.0; Leu, 3.8; $NH_3$, 2.9; Arg, 1.9. Examination of a sample by paper electrophoresis (collidine acetate, pH 6.3, and triethanolamine acetate, pH 4.0) reveals a small amount of aspartic acid as an impurity, but the peptide travels as a single component towards the cathode.

The fast moving, ninhydrin-negative, Sakaguchi-positive impurity, which is separated in the above mentioned counter-current distribution, on amino acid analysis reveals that it contains only the amino acids present in the hendecapeptide derivative (XI). Calc'd for the acetyl derivative of the free hendecapeptide (di-dichloroacetate): N, 17.8; Cl, 9.1; $CH_3CO$, 8.2. Found: N, 17.1; Cl, 9.5; $CH_3CO$, 7.0.

(b) (1) Tert.-butoxycarbonyl-L-aspartic acid α-p-nitrophenyl, β-benzyl ester.—To a cooled solution of tert. butoxycarbonyl-L-aspartic acid β-benzyl ester (16.2 g.) and of p-nitrophenol (8.5 g.) in ethyl acetate (150 ml.) dicyclohexylcarbodiimide (10.3 g.) is added. After two hours at room temperature, acetic acid (0.5 ml.) is added, the dicyclohexylurea is removed by filtration and washed with water and the combined filtrates are evaporated in vacuo. The oily residue crystallizes on the addition of 95% ethanol. The crystals are collected, washed with ethanol and dried. Evaporation of the mother liquor gives more of the same active ester. A total of 15 g. is obtained, M.P. 80–81°, $[\alpha]_D^{25}$ —36° (c. 2, dimethylformamide containing 1% acetic acid).

Analysis—Calc'd for $C_{22}H_{24}O_8N_2$: N, 6.30. Found: N, 6.34.

(2) N - Tert. - butyloxycarbonyl - O - benzyl - L - seryl - L - alanyl - nitro - L - arginyl - L - leucyl - L - glutaminyl - nitro - L - arginyl - L - leucyl - L - glutaminylglycyl - L - leucyl - L - valinamide (XIIIb).—To a suspension of the protected hendecapeptide (XI) (6.4 g.) in acetic acid (45 ml.), a 4 N solution of hydrobromic acid in acetic acid (45 ml.) is added. After about 2 hours at room temperature, the solution is diluted with ether (650 ml.). The gummy precipitate is triturated with ether, filtered, washed with ether and dried in vacuo over sodium hydroxide. The hydrobromide is dissolved in methanol (40 ml.) and reprecipitated with ether (300 ml.). The semisolid mass is triturated with ether, filtered, washed with ether and dried as before. The solid material is suspended in methanol (200 ml.) and enough triethylamine (5 ml.) is added to render the mixture slightly alkaline. The solvent is removed in vacuo and the residue extracted with chloroform (50 ml.). The insoluble material is dried in vacuo; 6.1 g., M.P. 242–248° dec. In a system of n-butanol-acetic acid-water (4:1:5), a single spot ($R_f$=0.62) is revealed with ninhydrin and by U.V. absorption. In the system butanol-pyridine-acetic acid-water (30:20:6:24) a single spot is also found ($R_f$=0.72). The hydrobromide is partially dissolved in dimethylformamide (20 ml.), triethylamine (0.6 ml.) and N-tert.-butyloxycarbonyl-O-benzyl-L-serine p-nitrophenyl ester in dimethylformamide (20 ml.) is added. The active ester is prepared from the corresponding acid (2.55 g.), p-nitrophenol (1.5 g.) and dicyclohexylcarbodiimide (1.7 g.) in ethyl acetate (21 ml.). The oil which is left after the removal of the dicyclohexylurea by filtration and of the solvent by evaporation is used without purification. The mixture is filtered and the yet undissolved material is dissolved with hot dimethylformamide (100 ml.). The mixture is allowed to stand overnight at room temperature. The protected dodecapeptide is isolated by the addition of ethyl acetate (1.5 liters); the precipitate is filtered and washed with ethyl acetate (0.5 liter). The crude produce (5.14 g.) after darkening at 255° melts with dec. at 298°.

A sample (1.0 g.) of this material is suspended in 95% ethanol (25 ml.), heated to boiling for a few minutes, and allowed to cool. During this treatment the solid material changes into a crystalline mass. The purified material is washed with 95% ethanol and dried. The product (0.78 g.) darkens from 255° and melts with dec. at 298–304°.

(3) Tert.-butyloxycarbonyl-β-benzyl - L - aspartyl - O-benzyl-L-seryl-L-alanyl-nitro - L - arginyl-L-leucyl-L-glutaminyl-nitro-L-arginyl-L-leucyl-L-leucyl - L - glutaminyl-glycyl-L-leucyl-L-valinamide (XIII).—The Protected dodecapeptide amide (XII) (3.3 g.) is dissolved in trifluoroacetic acid (32 ml.). After about fifteen minutes most of the trifluoroacetic acid is evaporated in vacuo and the syrupy residue diluted with ether (300 ml.). The precipitate is collected, washed with ether and dried in vacuo over sodium hydroxide. The free amine, trifluoroacetate (3.2 g.), has no well defined melting point; it softens at about 135°, darkens from 240° and decomposes at 304°. On paper chromatograms in the system butanol-acetic acid-water (4:1:5), a single component ($R_f$=0.52) is revealed by U.V. absorption and by ninhydrin. This material is dissolved in dimethylformamide (250 ml.), triethylamine (0.28 ml.) and tert.-butyloxycarbonyl-β-benzyl-L-aspartic acid p-nitrophenyl ester (1.76 g.). The solution is concentrated in vacuo to about 100 ml. Next day more triethylamine (0.28 ml.) and tert-butyloxycarbonyl-β-benzyl-L-aspartic acid p-nitrophenyl ester (0.88 g.) are added. One day later the mixture gave no more reaction with ninhydrin. It is diluted with ethyl acetate (500 ml.); the precipitate is filtered, washed with ethyl acetate and dried at room temperature. The protected tridecapeptide softens and darkens from about 250° and melts with dec. at 307–309°.

Analysis.—Calc'd for $C_{82}H_{132}N_{24}O_{24}$: C, 53.6; H, 7.6; N, 18.3. Found: C, 54.3; H, 7.2; N, 18.5.

(4) A sample of the fully protected tridecapeptide amide (XIII) (40 mg.) is dissolved in acetic acid (4 ml.); a 10% palladium on charcoal catalyst (40 mg.) is added and the mixture hydrogenated for 2 days.—The catalyst is filtered off and the acetic acid removed by evaporation from the frozen state. The residue is dissolved in acetic acid (1 mil.) and a solution of hydrogen chloride in acetic acid (2.6 N, 0.5 ml.) is added. Soon an oily precipitate forms. After about one-half hour the mixture is diluted with ether and the precipitate, which solidifies, is washed with ether. The white solid material (hydrochloride) is shown to be homogeneous on paper chromatograms in the systems of butanol-acetic acid-water (4:1:5) and butanol-acetic acid-pyridine-water (30:6:20:24). In this system the tridecapeptide travels as a single spot with $R_f$ values 0.32 and 0.28 respectively. The spots are revealed with ninhydrin and with the Sakaguchi reagent. On paper electrophoresis in collidine-acetate (pH 7) the material travels as a single band toward the cathode and is indistinguishable from the product obtained by procedure (a).

EXAMPLE 17

N-benzyloxycarbonyl-β-benzyl-L-aspartyl - O - benzyl-L-seryl-L-alanyl-nitro-L-arginyl-L-leucyl - L - glutaminyl-nitro-L-arginyl-L-leucy-L-leucyl - L - glutaminylglycyl-L-leucyl-L-valinamide (XIIIb)

The protected dodecapeptide amide (XIIb) (0.82 g.) is suspended in acetic acid (24 ml.). A solution of hydrochloric acid in acetic acid (2.6 N, 15 ml.) is added. This causes the dodecapeptide to dissolve, but soon the corresponding amine hydrochloride deposits as an oil. After one-half hour at room temperature, ether (ca. 200 ml.) is added to the mixture; the residue, which solidifies is washed with ether and dried over sodium hydroxide in vacuo. This hydrochloride is suspended in dimethylformamide (ca. 10 ml.) and treated with triethylamine (0.2 ml.) and N-tert.-butoxycarbonyl-L-aspartic acid β-benzyl-, α-p-nitro-phenyl ester (0.44 g.). The mixture is filtered from insoluble material, the fiber being ringed with dimethylformamide (5 ml.). After about 16 hours at room temperature, the mixture is diluted with ether (ca. 200 ml.). The protected tridecapeptide is washed with ether and dried; 0.66 g. of a product, M.P. 250–255° are obtained. Catalytic reduction of (XIIIb) followed by treatment with hydrochloric acid in acetic acid yields the free tridecapeptide (XIIIa).

EXAMPLE 18

$N^\alpha$-tert-butyloxycarbonyl-nitro-L-arginyl - β - benzyl - L-aspartyl-O-benzyl-L-seryl-L-alanyl-nitro-L - arginyl - L-leucyl-L-glutaminyl-nitro-L-arginyl - L - leucyl - L-glutaminyl-nitro-L-arginyl - L - leucyl - L - leucyl - L - glutaminylglycyl-L-leucyl-L-valinamide (XIV).

The protected tridecapeptide (XIII) (0.92 g.) is dissolved in trifluoroacetic acid (18 ml.). After about 15 minutes at room temperature, most of the trifluoroacetic acid is removed in vacuo and the residue is triturated with ether (100 ml.). The free amine-trifluoroacetate is filtered, washed with ether and dried in vacuo over sodium hydroxide. Paper chromatographic examination of this material in the system of butanol-acetic acid-water (4:1:5) reveals a single (ninhydrin yellow) component at $R_f=0.78$.

To a solution of the trifluoroacetate in dimethylformamide (15 ml.), tert.-butyloxycarbonyl-nitro-L-arginine 2,4-dinitrophenyl ester (0.43 g.) is added followed by triethylamine (0.07 ml.). The mixture is concentrated in vacuo to about 6–8 ml. and a second portion of triethylamine (0.07 ml.) is added. The next day the mixture is further concentrated in vacuo, and the residue is triturated with ethyl acetate. The protected tetradecapeptide is collected on a filter and is washed with ethyl acetate and with ether. The crude product (0.96 g.) sinters at about 145°, darkens from 220° and decomposes at 305°. An aliquot of this material (0.75 g.) is dissolved in the two layers (each 30 ml.) of the solvent system n-butanol-pyridine-acetic acid-water (4:2:1:7). The solution is placed in the first three tubes of a Craig apparatus and countercurrent distribution is carried out through one hundred transfers. Essentially all the material is found in a band corresponding to a distribution coefficient of 11.5, and the experimental curve is found to be practically identical with the curve calculated for this K value. The recovered material shows the same M.P. as the one before distribution.

*Analysis.*—Calc'd for $C_{88}H_{143}N_{29}O_{27}$: C, 51.8; H, 7.1; N, 19.9. Found: C, 52.2; H, 6.7; N, 19.8.

EXAMPLE 19

Tert. - butyloxycarbonyl - L - leucyl - nitro - L - arginyl-β - benzyl - L - aspartyl - O - benzyl - L - seryl - L - alanyl - nitro - L - arginyl - L - leucyl - L - glutaminyl-nitro - L - arginyl - L - leucyl - L - leucyl - L - glutaminyl-glycyl-L-leucyl-L-valinamide (XV)

The protected tetradecapeptide (XIV) (8.2 g.) is dissolved in trifluoroacetic acid (4 ml.). After 15 minutes at room temperature, the solution is concentrated in vacuo to a syrup, ether (500 ml.) is added and the precipitate is washed on a filter with ether. The air dried trifluoroacetate (8.1 g.) softens at 140° and melts (dec.) at 250°. In butanol-acetic acid-water (4:1:5), a single spot, $R_f=0.70$ is observed.

*Analysis.*—Calc'd: N, 19.8; F, 2.8. Found: N, 20.4; F, 3.3.

The trifluoroacetate is dissolved in dimethylformamide (40 ml.), triethylamine (0.60 ml.) and tert. butyloxycarbonyl-L-leucine p-nitrophenyl ester (2.8 g.) are added. The mixture is allowed to stand overnight at room temperature; it is then diluted with ethyl acetate (1300 ml.), the precipitate is filtered and washed with ethyl acetate (500 ml.). The air dried product (8.5 g., 98%) decomposes at 245–250° $[\alpha]_D^{27}$ —32° (c. 2 acetic acid).

*Analysis.*—Calc'd for $C_{94}H_{154}N_{30}O_{28}$: C, 52.4; H, 7.2; N, 19.5. Found: C, 52.4; H, 7.9; N, 19.3.

A sample of the protected pentadecapeptide is crystallized from acetic acid. This product darkens from 245° and decomposes at 318°.

EXAMPLE 20

Tert. - butyloxycarbonyl - nitro - L - arginyl - L - leucyl-nitro - L - arginyl - β - benzyl - L - aspartyl - O - benzyl-L - seryl - L - alanyl - nitro - L - arginyl - L - leucyl - L-glutaminyl - nitro - L - arginyl - L - leucyl L - leucyl-L-glutaminyl-glycyl-L-leucyl-L-valinamide (XVI)

The protected pentadecapeptide (XV) (8.2 g.) is dissolved in trifluoroacetic acid and the resulting free amine trifluoroacetate (8.15 g.) is isolated as described in the preparation of XV. This salt travels with an $R_f=0.65$ in the butanol-acetic acid-water (4:1:5) system and with $R_f=0.90$ in the system butanol-pyridine-acetic acid-water (30:20:6:24), M.P. softens at 135° dec. at 240–245°.

*Analysis.*—Calc'd: N, 19.3; F, 2.6. Found: N, 19.4; F, 2.9.

The trifluoroacetate (2.17 g.) is dissolved in dimethylformamide (20 ml.), and triethylamine (0.14 ml.) in dimethylformamide (1 ml.) is added followed by tert. butyloxycarbonyl-nitro-L-arginine, 2,4-dinitrophenyl ester (0.64 g.). Next day ethyl acetate (750 ml.) is added, the precipitate collected, washed with ethyl acetate and dried. The protected hexadecapeptide (XVI) (2.35 g., quantitative) softens at 155° and decomposes at about 240°, $[\alpha]_D^{26}$—30° (c., 2 acetic acid).

*Analysis.*—Calc'd for $C_{100}H_{165}N_{35}O_{31}$: C, 51.0; H, 7.1; N, 20.8. Found: C, 50.7; H, 7.4; N, 20.4.

EXAMPLE 21

N - tert. - butyloxycarbonyl - O - benzyl - L - seryl - nitro-L - arginyl - L - leucyl - nitro - L - arginyl - β - benzyl-L - aspartyl - O - benzyl - L - seryl - L - alanyl - nitro - L-arginyl - L - leucyl - L - glutaminyl - nitro - L - arginyl-L - leucyl - L - leucyl - L - glutaminylglycyl - L - leucyl-L-valinamide (XVII)

The protected hexadecapeptide (XVI) (2.30 g.) is treated with trifluoroacetic acid (24 ml.) and the trifluoroacetate of the free amine is isolated as described for XV. The salt (2.35 g.) softens at 150°, melts with dec. at 240–244°, and gives a single spot on paper chromatograms $R_f=0.57$ in butanol-acetic acid-water (4:1:5). The trifluoroacetate is dissolved in diethylformamide (40 ml.) and treated with triethylamine (0,14 ml.) and with tert. butyloxycarbonyl-O-benzyl - L - serine p-nitrophenyl ester (2 mmol.). One hour later more active ester (1 mmol.) is added. After about 16 hours the mixture is diluted with ethyl acetate (800 ml.); the protected heptadecapeptide separates as a crystalline powder. The crystals are washed on the filter with ethyl acetate and dried. The product (2.35 g., 95.5%) shrinks at 140° and decomposes at 245°, with gas evolution at 316°, $[\alpha]_D^{25}$—27° (c., 2 acetic acid).

*Analysis.*—Calc'd for $C_{11}H_{176}N_{36}O_{33}$: C, 52.2; H, 7.0; N, 19.9. Found: C, 52.3; H, 7.7; N, 19.4.

A sample (0.13 g.) is recrystallized from methanol-chloroform by slow evaporation. The recrystallized product (0.11 g.) shows the same M.P. behavior as the crude material.

EXAMPLE 22

Tert. - butyloxycarbonyl - L - leucyl - O - benzyl - L - seryl-nitro - L - arginyl - L - leucyl - nitro - L - arginyl - β-benzyl - L - aspartyl - O - benzyl - L - seryl - L - alanyl-nitro - L - arginyl - L - leucyl - L - glutaminyl - nitro - L-arginyl - L - leucyl - L - leucyl - L - glutaminylglycyl-L-leucyl-L-valinamide (XVIII)

The protected heptadecapeptide (SVII) (7.6 g.) is treated with trifluoroacetic acid (76 ml.). The trifluoroacetate thus obtained (7.7 g.) softens at 140°, decomposes at 250°. It gives a single, rather elongated spot in the system butanol-acetic acid-water (4:1:5) with $R_f=0.75$, and a round single spot ($R_f=0.92$) in the system butanol-pyridine acetic acid-water described earlier. The salt is dissolved in dimethylformamide (120 ml.) and treated with triethylamine (0.50 ml.) and tert. butyloxycarbonyl-L-leucine p-nitrophenyl ester (4.22 g.). Next day the mixture is diluted with ethyl acetate (3 liters) and the crystalline precipitate washed with ethyl acetate (1 liter). The air dried product (7.7 g., 97%) shrinks at 155°, darkens from 240° and decomposes at 310°, $[\alpha]_D^{33} -20°$ (c., 2 acetic acid).

*Analysis.*—Calc'd for $C_{116}H_{187}N_{37}O_{34}$: C, 52.7; H, 7.1; N, 19.6. Found: C, 52.5; H, 7.4; N, 19.6.

EXAMPLE 23

N-tert.-butyloxycarbonyl-γ-benzyl-L-glutamyl-L-leucyl-O-benzyl-L-seryl-nitro-L-arginyl-L-leucyl-nitro-L-arginyl-β-benzyl-L-aspartyl-O-benzyl-L-seryl-L-alanyl-nitro-L-arginyl-L-leucyl-L-glutaminyl-nitro-L-arginyl-L-leucyl-L-leucyl-L-glutaminylglycyl-L-leucyl-L-valinamide (XIX)

The tert. butyloxy group is removed from the protected octadecapeptide (XVIII) (7.4 g.) with trifluoroacetic acid (74 ml.). The trifluoroacetate (7.1 g.) gives a single spot on paper chromatograms in the systems mentioned above. It softens at 150°, darkens above 260° and decomposes at 315°. To a solution of the trifluoroacetate in dimethylformamide (85 ml.), triethylamine (0.40 ml.) and tert. butyloxycarbonyl-O-benzyl-L-glutamic acid p-nitrophenyl ester (3.85 g.) are added. Next day the protected nonadecapeptide (XIX) is isolated by dilution of the mixture with ethyl acetate (2.6 liters). The product is washed with ethyl acetate (1.3 liters) and dried. Compound (XIX) (7.4 g., 92%) softens at 135°, darkens from 240° and decomposes at 315°, $[\alpha]_D^{25} -22.5°$ (c., 2 acetic acid).

*Analysis.*—Calc'd for $C_{128}H_{200}N_{38}O_{37}$: C, 53.7; H, 7.0; N, 18.6. Found: C, 53.6; H, 7.5; N, 18.4.

EXAMPLE 24

N-tert.-butyloxycarbonyl-O-benzyl-L-seryl-γ-benzyl-L-glutamyl-L-leucyl-O-benzyl-L-seryl-nitro-L-arginyl-L-leucyl-nitro-L-arginyl-β-benzyl-L-aspartyl-O-benzyl-L-seryl-L-alanyl-nitro-L-arginyl-L-leucyl-L-glutaminyl-nitro-L-arginyl-L-leucyl-L-leucyl-L-glutaminyl-glycyl-L-leucyl-L-valinamide (XX)

The protected nonadecapeptide (XIX) (7.2 g.) is treated with trifluoroacetic acid. The trifluoroacetate (7.3 g., softens at 145°, darkens from 245°, decomposes at 312°) gives a single spot on paper chromatograms in the systems described; the spot is quite close to the front in the butanol-pyridine acetic acid-water system and near the front in the butanol-acetic acid-water (4:1:5) system.

The salt is dissolved in dimethylformamide (100 ml.), treated with triethylamine (0.35 ml.) and tert.-butyloxycarbonyl-O-benzyl-L-serine p-nitrophenyl ester (10 mmol.). Next day the mixture is diluted with ethyl acetate (3 liters), the crystalline precipitate is washed on the filter with the same solvent (1 liter). The air dried product (7.15 g., 94%) softens at 145°, darkens from 245° and decomposes at 322°, $[\alpha]_D^{24} -20°$ (c., 1 acetic acid).

EXAMPLE 25

Tert.-butyloxycarbonyl-L-threonyl-O-benzyl-L-seryl-γ-benzyl-L-glutamyl-L-leucyl-O-benzyl-L-seryl-nitro-L-arginyl-L-leucyl-nitro-L-arginyl-β-benzyl-L-aspartyl-O-benzyl-L-seryl-L-alanyl-nitro-L-arginyl-L-leucyl-L-glutaminyl-nitro-L-arginyl-L-leucyl-L-leucyl-L-glutaminylglycyl-L-leucyl-L-valinamide (XXI)

The protecting tert. butyloxycarbonyl group was removed from the eicosapeptide derivative (XX) (6.85 g.) by treatment with trifluoroacetic acid (68 ml.) at room temperature for 15 minutes. Evaporation of the trifluoroacetic acid and trituration of the residue with ether gave the trifluoroacetate of the amine (6.8 g.). In the paper chromatographic system butanolacetic acid-water (4:1:5), a single spot ($R_f=0.92$) is revealed with ninhydrin.

A solution of the trifluoroacetate (6.8 g.) is dissolved in dimethylformamide (45 ml.), triethylamine (0.31 ml.) and tert. butyloxycarbonyl-L-threonine 2,4-dinitrophenyl ester (2.6 g.) are added. The alkalinity of the mixture is maintained by the addition of small amounts of triethylamine in several portions, totaling 1 ml. About 7 hours later, the mixture is diluted with ethyl acetate (3 liters), the precipitate is collected on a filter and washed with ethyl acetate (1 liter). The product (6.7 g., 95%) softens at 140°, darkens from 235° and decomposes at 315°.

*Analysis.*—Found: C, 54.1; H, 7.3; N, 18.2.

EXAMPLE 26

Tert-butyloxycarbonyl-L-phenylalanyl-L-threnoyl-O-benzyl-L-seryl-γ-benzyl-L-glutamyl-L-leucyl-O-benzyl-L-seryl-nitro-L-arginyl-L-leucyl-nitro-L-arginyl-β-benzyl-L-aspartyl-O-benzyl-L-seryl-L-alanyl-nitro-L-arginyl-L-leucyl-L-glutaminyl-nitro-L-arginyl-L-leucyl-L-leucyl-L-glutaminylglycyl-L-leucyl-L-valinamide (XXII)

This compound is prepared in the same way as Compound XXI except that tert.-butyloxycarbonyl-L-phenylalanine p-nitrophenyl ester is used for acylation. The product is secured in excellent (97%) yield.

*Analysis.*—Found: C, 55.4; H, 7.2; N, 17.0.

EXAMPLE 27

Tert.-butyloxycarbonyl-L-threonyl-L-phenylalanyl-L-threonyl-O-benzyl-L-seryl-γ-benzyl-L-glutamyl-L-leucyl-O-benzyl-L-seryl-nitro-L-arginyl-L-leucyl-nitro-L-arginyl-β-benzyl-L-aspartyl-O-benzyl-L-seryl-L-alanyl-nitro-L-arginyl-L-leucyl-L-glutaminyl-nitro-L-arginyl-L-leucyl-L-leucyl-L-glutaminylglycyl-L-leucyl-L-valinamide (XXIII)

This compound is prepared from the protected docosapeptide in the same way as described for XXI. Here again tert.-butyloxycarbonyl-L-threonine 2,4-dinitrophenyl ester is used as acylating agent and the alkalinity is maintained during the reaction by the addition of small portions of triethylamine. The protected tricosapeptide is isolated in the manner described in the Example XXI an excellent yield (98%) of a homogeneous product is obtained.

*Analysis.*—Found: C, 54.0; H, 6.8; N, 17.5.

EXAMPLE 28

Tert.-butyloxycarbonyl-glycyl-L-threonyl-L-phenylalanyl-L-threonyl-O-benzyl-L-seryl-γ-benzyl-L-glutamyl-L-leucyl-O-benzyl-L-seryl-nitro-L-arginyl-L-leucyl-nitro-L-arginyl-β-benzyl-L-aspartyl-O-benzyl-L-seryl-L-alanyl-nitro-L-arginyl-L-leucyl-L-glutaminyl-nitro-L-arginyl-L-leucyl-L-leucyl-L-glutaminylglycyl-L-leucyl-L-valinamide (XXIV)

The tert. butyloxycarbonyl group is removed with trifluoroacetic acid from the protected tricosapeptide (XXIII) as described in the preparation of XXI. The amine trifluoroacetate thus obtained is acylated with tert. butyloxycarbonyl-glycine p-nitrophenyl ester. The protected tetracosapeptide XXIV is obtained in excellent yield (97%) by dilution of the reaction mixture with ethyl acetate.

*Analysis.*—Found: C, 54.7; H, 7.0; N, 17.4.

EXAMPLE 29

Tert.-butyloxycarbonyl-β-benzyl-L-aspartylglycyl-L-threonyl-L-phenylalanyl-L-threonyl-O-benzyl-L-seryl-γ-benzyl-L-glutamyl-L-leucyl-O-benzyl-L- seryl-nitro - L-arginyl - L-leucyl-nitro - L-arginyl-β-benzyl-L-aspartyl - O-benzyl - L-seryl-L-alanyl-nitro-L-arginyl - L-leucyl - L-glutaminyl-nitro - L-arginyl-L-leucyl-L-leucyl - L-glutaminylglycyl - L-leucyl - L-valinamide (XXV)

This pentacosapeptide is prepared by the same proceduce as the preceding protected peptides, that is, removal of the tert. butyloxycarbonyl group from XXIV with trifluoroacetic acid and acylation of the amine with the p-nitrophenyl ester of tert.-butyloxycarbonyl-β-benzyl-L-aspartic acid. The protected pentacosapeptide XXV is isolated by dilution of the reaction mixture with ethyl acetate. A yield of 94% is obtained.

EXAMPLE 30

Tert.-butyloxycarbonyl - O-benzyl - L-seryl-β-benzyl - L-aspartylglycyl-L-threonyl - L-phenylalanyl-L-threonyl-O-benzyl - L-seryl-γ-benzyl - L-glutamyl-L-leucyl - O-benzyl-L-seryl-nitro - L-arginyl - L-leucyl-nitro - L-arginyl-β-benzyl - L-aspartyl - O-benzyl-L-seryl - L-alanyl-nitro - L-arginyl-L-leucyl - L-glutaminyl-nitro-L-arginyl - L-leucyl - L-leucyl - L-glutaminylglycyl-L-leucyl-L-valinamide (XXVI)

This hexacosapeptide is prepared in the way XXI and XXII are obtained except that tert.-butyloxycarbonyl-O-benzyl-L-serine p-nitrophenyl ester is used for acylation. The protected hexacosapeptide XXVI is isolated in 91% yield by dilution of the reaction mixture with ethyl acetate.

EXAMPLE 31

Bis-benzyloxycarbonyl-L-histidyl - O-benzyl - L-seryl-β-benzyl-L-aspartylglycyl - L-threonyl - L-phenylalanyl-L-threonyl-O-benzyl - L-seryl-γ-benzyl - L-glutamyl-L-leucyl-O-benzyl - L-seryl-nitro - L-arginyl - L-leucyl-nitro - L-arginyl-β-benzyl - L-aspartyl - O-benzyl-L-seryl-L-alanyl-nitro - L-arginyl - L-leucyl-L-glutaminyl-nitro-L-arginyl - L-leucyl - L-leucyl - L-glutaminylglycyl-L-leucyl-L-valinamide (XXVII)

The protected heptacosapeptide XXVII is prepared by removal of the tert. butyloxycarbonyl group from the protected hexacosapeptide XXVI with trifluoroacetic acid. The trifluoroacetate is dissolved in dimethylformamide, an equivalent amount of triethylamine is added followed by an excess of bis - benzyloxycarbonyl - L-histidine p-nitrophenyl ester. The protected heptacosapeptide is obtained in very good yield. Catalytic reduction of the protected heptacosapeptide in acetic acid, in the presence of a palladium on charcoal, catalyst gives material with the biological properties of the hormone (secretin).

What is claimed is:
1. A compound of the formula

R-L-valinamide wherein R is selected from the group consisting of protected glycyl-L-leucyl,
glycyl-L-leucyl,
protected L-glutaminylglycyl-L-leucyl,
L-glutaminylglycyl-L-leucyl,
protected L-leucyl-L-glutaminylglycyl-L1leucyl,
L-leucyl-L-glutaminylglycyl-L-leucyl,
protected L-leucyl-L-glutaminylglycyl-L-leucyl, leucyl,
protected L-arginyl-L-leucyl-L-leucyl-glutaminylglycyl-L-leucyl,
L-arginyl-L-leucyl-L-leucyl-glutaminylglycyl-L-leucyl,
protected L-glutaminyl-L-arginyl-L-leucyl-L-leucyl-L-glutaminylglycyl-L-leucyl,
L-glutaminyl-L-arginyl-L-leucyl-L-leucyl-L-glutaminylglycyl-L-leucyl,
protected L-leucyl-L-glutaminyl-L-arginyl-L-leucyl-L-leucyl-L-glutaminylglycyl-L-leucyl,
L-leucyl-L-glutaminyl-L-arginyl-L-leucyl-L-leucy-L-glutaminylglycyl-L-leucyl,
protected L-arginyl-L-leucyl-L-glutaminyl-L-arginyl-L-leucyl-L-leucyl-L-glutaminylglycyl-L-leucyl,
L-arginyl-L-leucyl-L-glutaminyl-L-arginyl-L-leucyl-L-leucyl-L-glutaminylglycyl-L-leucyl,
protected L-alanyl-L-arginyl-L-leucyl-L-glutaminyl-L-arginyl-L-leucyl-L-leucyl-L-glutaminylglycyl-L-leucyl,
L-alanyl-L-arginyl-L-leucyl-L-glutaminyl-L-arginyl-L-leucyl-L-leucyl-L-glutaminylglycyl-L-leucyl,
protected L-seryl-L-alanyl-L-arginyl-L-leucyl-L-glutaminyl-L-arginyl-L-leucyl-L-leucyl-L-glutaminylglycyl-L-leucyl,
L-seryl-L-alanyl-L-arginyl-L-leucyl-L-glutaminyl-L-arginyl-L-leucyl-L-leucyl-L-glutaminylglycyl-L-leucyl,
protected L-aspartyl-L-seryl-L-alanyl-L-arginyl-L-leucyl-L-glutaminyl-L-arginyl-L-leucyl-L-leucyl-L-glutaminylglycyl-L-leucyl,
L-aspartyl-L-seryl-L-alanyl-L-arginyl-L-leucyl-L-glutaminyl-L-arginyl-L-leucyl-L-leucyl-L-glutaminylglycyl-L-leucyl,
protected L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
protected L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
protected L-arginyl-L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
L-arginyl-L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
protected L-seryl-L-arginyl-L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
L-seryl-L-arginyl-L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
protected L-leucyl-L-seryl-L-arginyl-L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
L-leucyl-L-seryl-L-arginyl-L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
protected L-glutamyl-L-leucyl-L-seryl-L-arginyl-L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
L-glutamyl-L-leucyl-L-seryl-L-arginyl-L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
protected L-seryl-L-glutamyl-L-leucyl-L-seryl-L-arginyl-L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
L-seryl-L-glutamyl-L-leucyl-L-seryl-L-arginyl-L-leucyl-L-arginyl-L-aspartyl-L-seryl-L-alanyl-L-arginyl-L-leucyl-L-glutaminyl-L-arginyl-L-leucyl-L-leucyl-L-glutaminylglycyl-L-leucyl,
protected L-threonyl-L-seryl-L-glutamyl-L-leucyl-L-seryl-L-arginyl-L-leucyl-L-arginyl-L-aspartyl-L- seryl-L-alanyl-L-arginyl-L-leucyl-L-glutaminyl-
L-arginyl-L-leucyl-L-leucyl-L-glutaminylglycyl-L-
leucyl,
L-threonyl-L-seryl-L-glutamyl-L-leucyl-L-seryl-L-
arginyl-L-leucyl-L-arginyl-L-aspartyl-L-seryl-L-
alanyl-L-arginyl-L-leucyl-L-glutaminyl-L-arginyl-
L-leucyl-L-leucyl-L-glutaminylglycyl-L-leucyl,
protected L-phenylalanyl-L-threonyl-L-seryl-L-glu-
tamyl-L-leucyl-L-seryl-L-arginyl-L-leucyl-L-
arginyl-L-aspartyl-L-seryl-L-alanyl-L-arginyl-L-
leucyl-L-glutaminyl-L-arginyl-L-leucyl-L-leucyl-
L-glutaminylglycyl-L-leucyl,
L-phenylalanyl-L-threonyl-L-seryl-L-glutamyl-L-
leucyl-L-seryl-L-arginyl-L-leucyl-L-arginyl-L-
aspartyl-L-seryl-L-alanyl-L-arginyl-L-leucyl-L-
glutaminyl-L-arginyl-L-leucyl-L-leucyl-L-glu-
taminylglycyl-L-leucyl,
protected L-threonyl-L-phenylalanyl-L-threonyl-L-
seryl-L-glutamyl-L-leucyl-L-seryl-L-arginyl-L-
leucyl-L-arginyl-L-aspartyl-L-seryl-L-alanyl-L-
arginyl-L-leucyl-L-glutaminyl-L-arginyl-L-leucyl-
L-leucyl-L-glutaminylglycyl-L-leucyl,
L-threonyl-L-phenylalanyl-L-threonyl-L-seryl-L-glu-
tamyl-L-leucyl-L-seryl-L-arginyl-L-leucyl-L-
arginyl-L-aspartyl-L-seryl-L-alanyl-L-arginyl-L-leucyl-
L-glutaminyl-L-arginyl-L-leucyl-L-leucyl-L-glu-
taminylglycyl-L-leucyl,
protected glycyl-L-threonyl-L-phenylalanyl-L-threonyl-
L-seryl-L-glutamyl-L-leucyl-L-seryl-L-arginyl-L-
leucyl-L-arginyl-L-aspartyl-L-seryl-L-alanyl-L-
arginyl-L-leucyl-L-glutaminyl-L-arginyl-L-leucyl-
L-leucyl-L-glutaminylglycyl-L-leucyl,
glycyl-L-threonyl-L-phenyl-alanyl-L-threonyl-L-seryl-
L-glutamyl-L-leucyl-L-seryl-L-arginyl-L-leucyl-L-
arginyl-L-aspartyl-L-seryl-L-alanyl-L-arginyl-L-
leucyl-L-glutaminyl-L-arginyl-L-leucyl-L-leucyl-
L-glutaminylglycyl-L-leucyl,
protected L-aspartyl-glycyl-L-thereonyl-L-phenylalanyl-
L-threonyl-L-seryl-L-glutamyl-L-leucyl-L-seryl-L-
arginyl-L-leucyl-L-arginyl-L-aspartyl-L-seryl-L1
alanyl-L-arginyl-L-leucyl-L-glutaminyl-L-arginyl-
L-leucyl-L-leucyl-L-glutaminylglycyl-L-leucyl,
L-aspartyl-glycyl-L-threonyl-L-phenylalanyl-L-threonyl-
L-seryl-L-glutamyl-L-leucyl-L-seryl-L-arginyl-L-
leucyl-L-arginyl-L-aspartyl-L-seryl-L-alanyl-L-
arginyl-L-leucyl-L-glutaminyl-L-arginyl-L-leucyl-
L-leucyl-L-glutaminylglycyl-L-leucyl,
protected L-seryl-L-aspartyl-glycyl-L-threonyl-L-phenyl-
alanyl-L-threonyl-L-seryl-L-glutamyl-L-leucyl-L-
seryl-L-arginyl-L-leucyl-L-arginyl-L-aspartyl-L-
seryl-L-alanyl-L-arginyl-L-leucyl-L-glutaminyl-L-
arginyl-L-leucyl-L-glutaminyl-L-arginyl-L-leucyl-
leucyl,
L-seryl-L-aspartylglycyl-L-threonyl-L-phenylalanyl-L-
threonyl-L-seryl-L-glutamyl-L-leucyl-L-seryl-L-
arginyl-L-leucyl-L-arginyl-L-aspartyl-L-seryl-L-
alanyl-L-arginyl-L-leucyl-L-glutaminyl-L-arginyl-
L-leucyl-L-leucyl-L-glutaminylglycyl-L-leucyl,
protected L-histidyl-L1seryl-L-aspartyl-glycyl-L-threonyl-
L-phenylalanyl-L-threonyl-L-seryl-L-aspartyl-L-
seryl-L-alanyl-L-arginyl-L-leucyl-L-glutaminyl-L-
arginyl-L-leucyl-L-leucyl-L-glutaminylglycyl-L-leucyl,
and salts thereof, wherein the amino protective groups
are selected from the group consisting of benzyloxycar-
bonyl, tertiary butyloxycarbonyl, phthalyl, o-nitrophenyl-
sulfenyl and tosyl, the carboxyl protective groups are se-
lected from the group consisting of methyl, ethyl, ter-
tiary butyl and benzyl, the hydroxyl protecting groups are
selected from the group consisting of tert. butyl, benzyl
and tetrahydropyranyl, and the guanidine protecting
groups are selected from the group consisting of nitro,
tosyl and p-nitrobenzyloxycarbonyl.

2. A compound according to claim 1 selected from the
group consisting of peptides of the formula R-glycyl-L-leucyl-L-valinamide wherein R is selected from the group consisting of hy-
drogen and benzyloxycarbonyl, and the hydrobromide salt
of that compound wherein R represents hydrogen.

3. A compound according to claim 1 selected from the
group consisting of peptides of the formula R-L-glutaminylglycyl-L-leucyl-L-valinamide wherein R is selected from the group consisting of hydro-
gen and benzyloxycarbonyl, and the hydrobromide salt of
that compound wherein R represents hydrogen.

4. A compound according to claim 1 selected from the
group consisting of peptides of the formula R-L-leucyl-L-glutaminylglycyl-L-leucyl-L-valinamide wherein R is selected from the group consisting of hydro-
gen and benzyloxycarbonyl, and the hydrobromide salt of
that compound wherein R represents hydrogen.

5. A compound according to claim 1 having the name
benzyloxycarbonyl - L-leucyl-L-leucyl-L-glutaminylglycyl-
L-leucyl-L-valinamide.

6. A compound according to claim 1 having the name
L - leucyl - L-leucyl-L-glutaminylglycyl-L-leucyl-L-valin-
amide hydrobromide.

7. A compound according to claim 1 selected from the
group consisting of peptides of the formula R-nitro-L-arginyl-L-leucyl-L-leucyl-L-
glutaminylglycyl-L-leucyl-L-valinamide wherein R is selected from the group consisting of hydro-
gen and benzyloxycarbonyl, and the hydrobromide salt of
that compound wherein R represents hydrogen.

8. A compound according to claim 1 selected from the
group consisting of peptides of the formula R-L-glutaminyl-nitro-L-arginyl-L-leucyl-L-leucyl-L-
glutaminyl-glycyl-L-leucyl-L-valinamide wherein R is selected from the group consisting of hy-
drogen and benzyloxycarbonyl, and the hydrobromide salt
of that compound wherein R represents hydrogen.

9. A compound according to claim 1 selected from the
group consisting of peptides of the formula R-L-leucyl-L-glutaminyl-nitro-L-arginyl-L-leucyl-L-
leucyl-L-glutaminylglycyl-L-leucyl-L-valinamide wherein R is selected from the group consisting of hydro-
gen and benzyloxycarbonyl, and the hydrobromide salt of
that compound wherein R represents hydrogen.

10. A compound according to claim 1 selected from the
group consisting of peptides of the formula R - nitro - L-arginyl-L-leucyl-L-glutaminyl-nitro-L-arginyl-
L - leucyl-L-leucyl-L-glutaminylglycyl-L-leucyl-L-valin-
amide wherein R is selected from the group consisting of hydro-
gen and benzyloxycarbonyl, and the hydrobromide salt of
that compound wherein R represents hydrogen.

11. A compound according to claim 1 selected from the
group consisting of peptides of the formula R - L - alanyl-nitro-L-arginyl-L-leucyl-L-glutaminyl-nitro-
L - arginyl - L - leucyl-L-leucyl-L-glutaminyllglycyl-L-
leucyl-L-valinamide wherein R is selected from the group consisting of hydro-
gen and benzyloxycarbonyl, the hydrobromide salt and the
acetate salt of that compound wherein R represents hy-
drogen.

12. A compound according to claim 1 selected from the
group consisting of peptides of the formula R - L - seryl-L-alanyl-L-arginyl-L-leucyl-L-glutaminyl-L-
arginyl - L-leucyl-L-leucyl-L-glutaminylglycyl-L-leucyl-
L-valinamide acetate wherein R is selected from the group consisting of hydro-
gen and benzyloxycarbonyl.

13. A compound according to claim 1 selected from the
group consisting of peptides of the formula N - R - O - R'-L-seryl-L-alanyl-nitro-L-arginyl-L-leucyl-L - glutaminyl-nitro-L-arginyl-L-leucyl-L-leucyl-L-glutaminylglycyl-L-leucyl-L-valinamide wherein R is selected from the group consisting of hydrogen and t-butyloxycarbonyl and R' is selected from the group consisting of hydrogen and benzyl, provided that when R is t-butyloxycarbonyl, R' is benzyl, the hydrochloride of that compound wherein R and R' each represent hydrogen and the trifluoroacetate salt of that compound wherein R represents hydrogen and R' represents benzyl.

14. A compound according to claim 1 having the name N - benzyloxycarbonyl - L-aspartyl-L-seryl-L-alanyl-L-arginyl - L-leucyl-L-glutaminyl-L-arginyl-L-leucyl-L-leucyl-L-glutaminyl-glycyl-L-leucyl-L-valinamide acetate.

15. A compound according to claim 1 having the name t - butyloxycarbonyl-β-benzyl-L-aspartyl-O-benzyl-L-seryl-L - alanyl - nitro-L-arginyl-L-leucyl-L-glutaminyl-nitro-L-arginyl - L-leucyl-L-leucyl-L-glutaminylglycyl-L-leucyl-L-valinamide.

16. A compound according to claim 1 selected from the group consisting of the hydrochloride and dichloroacetate salt of L - aspartyl-L-seryl-L-alanyl-L-arginyl-L-leucyl-L-glutaminyl - L - arginyl - L-leucyl-L-leucyl-L-glutaminylglycyl-L-leucyl-L-valinamide.

17. A compound according to claim 1 selected from the group consisting of peptides of the formula $N^\alpha$ - R - nitro - L-arginyl-β-benzyl-L-aspartyl-O-benzyl-L-seryl - L - alanyl-nitro-L-arginyl-L-leucyl-L-glutaminyl-nitro - L - arginyl - L-leucyl-L-leucyl-glutaminyglycyl-L-leucyl-L-valinamide wherein R is selected from the group consisting of hydrogen and t-butyloxycarbonyl, and the trifluoroacetate salt of that compound wherein R represents hydrogen.

18. A compound according to claim 1 selected from the group consisting of the trifluoroacetate salt and the t-butyloxycarbonyl derivative of L-leucyl-nitro-L-arginyl-β-benzyl - L - aspartyl-O-benzyl-L-seryl-L-alanyl-nitro-L-arginyl - L - leucyl-L-glutaminyl-nitro-L-arginyl-L-leucyl-L-leucyl-L-glutaminylglycyl-L-leucyl-L-valinamide.

19. A compound according to claim 1 selected from the group consisting of the trifluoroacetate salt and the t - butyloxy - carbonyl derivative of nitro - L - arginyl - L - leucyl - nitro - L - arginyl - β - benzyl - L - aspartyl - O - benzyl - L - seryl  L - alanyl - nitro - L - arginyl - L - leucyl - L - glutaminyl - nitro - L - arginyl - L - leucyl - L - glutaminyl - nitro - L - arginyl - L - leucyl - L -leucyl - L - glutaminylglycyl - L - leucyl - L - valinamide.

20. A compound according to claim 1 selected from the group consisting of the trifluoroacetate salt and the t - butyloxy - carbonyl derivative of O - benzyl - L - seryl - nitro - L - arginyl - L - leucyl - nitro - L - arginyl - β - benzyl - L - aspartyl - O - benzyl - L - seryl - L - analyl - nitro - L - arginyl - L - leucyl - L - glutaminyl - nitro - L - arginyl - L - leucyl - L - leucyl - L - glutaminylglycyl - L - leucyl - L - valinamide.

21. A compound according to claim 1 selected from the group consisting of the trifluoroacetate salt and the t - butyloxy - carbonyl derivative of L - leucyl - O - benzyl - L - seryl - nitro - L - arginyl - L - leucyl - nitro - L - arginyl - β - benzyl - L - aspartyl - O - benzyl - L - seryl - L - alanyl - nitro - L - arginyl - L - leucyl - L - gluutaminyl - nitro - L - arginyl - L - leucyl - L - leucyl - L-glutaminylglycyl-L-leucyl-L-valinamide.

22. A compound according to claim 1 selected from the group consisting of the trifluoroacetate salt and the t - butyloxy - carbonyl derivative of γ - benzyl - L - glutaminyl - L - leucyl - L - O - benzyl - L - seryl - nitro - L - arginyl - L - leucyl - nitro - L -arginyl - β - benzyl - L - aspartyl - O - benzyl - L - seryl - L - alanyl - nitro - L - arginyl - L - leucyl - L - gluataminyl - nitro - L - arginyl - L - leucyl - L - leucyl - L - glutaminylglycyl - L-leucyl-L-valinamide.

23. A compound according to claim 1 selected from the group consisting of the trifluoroacetate salt and the t-butyloxy - carbonyl derivative of O - benzyl - L - seryl - γ - benzyl - L - glutaminyl - L - leucyl - O - benzyl - L - seryl - nitro - L - arginyl - L - leucyl - nitro - L - arginyl - β - benzyl - L - aspartyl - O - benzyl - L - seryl - L - alanyl - nitro - L - arginyl - L - leucyl - L - glutaminyl - nitro - L - arginyl - L - leucyl - L - leucyl - L - glutaminyl-glycyl-L-leucyl-L-valinamide.

24. A compound according to claim 1 selected from the group consisting of the trifluoroacetate salt and the t - butyloxy - carbonyl derivative of L - threonyl - O - benzyl - L - seryl - γ - benzyl - L - glutamyl - L - leucyl - O - benzyl - L - seryl - nitro - L - arginyl - L - leucyl - nitro - L - arginyl - β - benzyl - L - aspartyl - O - benzyl - L - seryl - L - alanyl - nitro - L - arginyl - L - leucyl - L - glutaminyl - nitro - L - arginyl - L - leucyl - L - leucyl - L-glutaminylglycyl-L-leucyl-L-valinamide.

25. A compound according to claim 1 selected from the group consisting of the trifluoroacetate salt and the t - butyloxy - carbonyl derivative of L - phenylalanyl - L - threonyl - O - benzyl - L - seryl - γ - benzyl - L - glutamyl - L - leucyl - O - benzyl - L - seryl - nitro - L - arginyl - L - leucyl - nitro - L - arginyl - β - benzyl - L - aspartyl - O - benzyl - L - seryl - L - alanyl - nitro - L - arginyl - L - leucyl - L - glutaminyl - nitro - L - arginyl - L - leucyl - L - leucyl - L - glutaminylglycyl - L - leucyl - L-valinamide.

26. A compound according to claim 1 selected from the group consisting of the trifluoroacetate salt and the t - butyloxy - carbonyl derivative of L - threonyl - L - phenylalanyl - L - threonyl - O - benzyl - L - seryl - γ - benzyl - L - glutamyl - L - leucyl - O - benzyl - L - seryl - nitro - L - arginyl - L - leucyl - nitro - L - arginyl - β - benzyl - L - aspartyl - O - benzyl - L - seryl - L -alanyl - nitro - L - arginyl - L - leucyl - L - glutaminyl - nitro - L - arginyl - L - leucyl - L - leucyl - L - glutaminylglycyl-L-leucyl-L-valinamide.

27. A compound according to claim 1 selected from the group consisting of the trifluoroacetate salt and the t - butyloxy - carbonyl derivative of glycyl - L - threonyl - L - phenylalanyl - L - threonyl - O - benzyl - L - seryl - γ - benzyl - L - glutamyl - L - leucyl - O - benzyl - L - seryl - nitro  L - arginyl - L - leucyl - nitro - L - arginyl - β - benzyl - L - aspartyl - O - benzyl - L - seryl - L - alanyl - nitro - L - arginyl - L - leucyl - L - glutaminyl - nitro - L - arginyl - L - leucyl - L - leucyl - L - glutaminylglycyl-L-leucyl-L-valinamide.

28. A compound according to claim 1 selected from the group consisting of the trifluoroacetate salt and the t - butyloxy - carbonyl derivative of β - benzyl - L - aspartylglycyl - L - threonyl - L - phenylalanyl - L - threonyl - O - benzyl - L - seryl - γ - benzyl - L - glutamyl - L - leucyl - O - benzyl - L - seryl - nitro - L - arginyl - L - leucyl - nitro - L - arginyl - β - benzyl - L - aspartyl - O - benzyl - L - seryl - L - alanyl - nitro - L - arginyl - L - leucyl - L - glutaminyl - nitro - L - arginyl - L - leucyl - L - leucyl - L - glutaminylglycyl - L - leucyl - L -valinamide.

29. A compound according to claim 1 selected from the group consisting of the trifluoroacetate salt and the t - butyloxy - carbonyl derivative of O - benzyl - L - seryl - β - benzyl - L - aspartyl - glycyl -L - threonyl - L - phenylalanyl - L - threonyl - O - benzyl - L - seryl - γ - benzyl - L - glutamyl - L - leucyl - O - benzyl - L - seryl - nitro - L - arginyl - L - leucyl - nitro - L - arginyl - β - benzyl - L - aspartyl - O - benzyl - L - seryl - L - alanyl - nitro - L - arginyl - L - leucyl - L - glutaminyl - nitro - L - arginyl - L - leucyl - L - leucyl - L -glutaminylglycyl - L-leucyl-L-valinamide.

30. A compound according to claim 1 having the name bis - benzyloxycarbonyl - L - histidyl - O - benzyl - L - seryl - β - benzyl - L - aspartylglycyl - L - threonyl - L - phenylalanyl - L - threonyl - O - benzyl - L - seryl - γ - benzyl - L - glutamyl - L - leucyl - O - benzyl - L -seryl - nitro - L - arginyl - L - leucyl - nitro - L - arginyl - β - benzyl - L - aspartyl - O - benzyl - L - seryl - L -alanyl - nitro - L - arginyl - L - leucyl - L -glutaminyl - nitro - L - arginyl - L - leucyl - L - leucyl - L - glutaminylglycyl - L-leucyl-L-valinamide.

References Cited

Bodanszky et al.: Chem. Ind. (London) 1966, 1597–1598.

Bodanszky et al.: Chem. Ind. (London) 1966, 1757–1758.

Bodanszky et al.: J. Am. Chem. Soc. 89, 685–689 (1967).

Levine et al.: Biochemistry (Wash.) 5, 3441–3443 (1966).

Mutt et al.: Biochemistry (Wash.) 4, 2358–2362 (1965).

LEWIS GOTTS, *Primary Examiner.*

M. KASSENOFF, *Assistant Examiner.*

U.S. Cl. X.R.

260—309, 471, 479

PO-1050
(5/69)

UNITED STATES PATENT OFFICE
CERTIFICATE OF CORRECTION

Patent No. 3,417,072    Dated December 17, 1968

Inventor(s)   Miklos Bodanszky

It is certified that error appears in the above-identified patent and that said Letters Patent are hereby corrected as shown below:

In column 3, line 39, "evaportaion" should read - - evaporation - -. In column 4, line 40, "hydrovide" should read - - hydroxide - -. In column 5, line 43, "butanol-acetice" should read - - butanol-acetic - -; and line 54, "$C_{30}H_{56}N_7O_8$" should read - - $C_{30}H_{56}N_8O_7$ - -. In column 7, line 21, "glutaminylglycil" should read - - glutaminylglycyl - -; and line 29, "hydrbromide" should read - - hydrobromide - -. In column 8, line 28, "(1.0) g.)" should read - - (1.0 g.) - -. In column 9, line 25, "butoxycarbonyl" should read - - butoxylcarbonyl - -; and line 44, "(XIIIb)" should read - - (XIIb) - -. Column 10, line 47, "(1 mil.)" should read - - (1 ml.) - -; and line 65, "L-leucy-L-" should read - - L-leucyl-L- - -. In column 11, line 5, "fiber" should read - - filter - -; and at the end of line 17 delete "-L-glu" and at the beginning of line 18 delete "taminyl-nitro-L-arginyl-L-leucyl". In column 12, line 51, "(0,14 ml.)" should read - - (0.14 ml.) - -. In column 13, line 34, "isoQlated" should read - - isolated - -. In column 14, line 21, "threnoyl" should read - - threonyl - -. In column 15, line 62, "Llleucyl," should read - - L-leucyl, - -; in line 64, after "L-leucyl" should be inserted - - -L-leucyl - -; and on line 65, delete "leucyl,". In column 16, line 2, at the beginning of the line delete "L-leucyl-". In column 17, line 40, at the end of the line "Ll" should read - - L- - -; at the end of line 52 delete "glutaminyl-L-arginyl-L-leucyl-" and on line 53 delete "leucyl," and insert therefor - - leucyl-L-glutaminylglycyl-L-leucyl, - -; in line 59 "Llseryl" should read - - L-seryl - -; and on line 60, after "seryl-L-" insert the following - - glutaminyl-L-leucyl-L-seryl-L-arginyl-L-leucyl-L-arginyl-L- - -. In column 18, line 60, "glutaminyllglycyl" should read - - glutaminyl-glycyl - -. In column 19, line 30, after the second "L-leucyl-" insert - - L- - -; line 47, delete "L-glutaminyl-nitro-L-arginyl-L-leucyl"; and on line 63, "gluutaminyl" should read - - glutaminyl - -.

Signed and sealed this 7th day of April 1970.

(SEAL)
Attest:

EDWARD M. FLETCHER, JR.
Attesting Officer

WILLIAM E. SCHUYLER, JR.
Commissioner of Patents